US008938780B2

(12) United States Patent
Ekdahl

(10) Patent No.: US 8,938,780 B2
(45) Date of Patent: Jan. 20, 2015

(54) DISPLAY AUTHENTICATION

(75) Inventor: Patrik Ekdahl, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 394 days.

(21) Appl. No.: 13/430,875

(22) Filed: Mar. 27, 2012

(65) Prior Publication Data
US 2013/0263215 A1    Oct. 3, 2013

(51) Int. Cl.
*G06F 21/00*    (2013.01)

(52) U.S. Cl.
USPC ................................. 726/2; 726/22

(58) Field of Classification Search
CPC ............... H04L 29/06911; H04L 29/06877
USPC ........................................ 726/2, 22
See application file for complete search history.

(56) References Cited

U.S. PATENT DOCUMENTS

| 2005/0235351 | A1 | 10/2005 | Seltzer et al. |
| 2006/0253706 | A1 | 11/2006 | Roberts et al. |
| 2010/0031022 | A1 | 2/2010 | Kramer |
| 2010/0092076 | A1 | 4/2010 | Iofis |
| 2011/0093723 | A1 | 4/2011 | Brown et al. |

FOREIGN PATENT DOCUMENTS

| EP | 1056014 A1 | 11/2000 |
| GB | 2421093 A | 6/2006 |
| WO | 2007/087352 A2 | 8/2007 |
| WO | 2008/048800 A1 | 4/2008 |
| WO | 2011/078056 A1 | 6/2011 |

OTHER PUBLICATIONS

Dhamija et al (The Battle against Phishing: Dynamic Security Skins, Proc. 2005 Symposium on Usable Privacy and Security, Jul. 6-8, 2005, Pittsburgh, PA, pp. 77-88, ACM, NY, NY.*
Dhamija et al., The Battle against Phishing: Dynamic Security Skins, Proc. 2005 Symposium on Usable Privacy and Security, Jul. 6-8, 2005, Pittsburgh, PA, pp. 77-88, ACM, NY, NY.
Dhamija et al., Phish and HIPs: Juman Interactive Proofs to Detect Phishing Attacks, Second Int'l Workshop in Human Interactive Proofs, May 2005, pp. 127-141, Springer-Verlag, Berlin.
Huang et al., Countermeasure Techniques for Deceptive Phishing Attack, Proc. 2009 Int'l Conf on New Trends in Info and Service Science, 2009, pp. 636-641, IEEE, Washington, DC.
Maurer et al., Shining Chrome: Using Web Browser Personas to Enhance SSL Certificate Visualization, Proc. 13th Int'l Conf. Human-Computer Interaction, 2011, vol. Part IV, pp. 44-51, Springer-Verlag, Berlin.
TEE System Architecture, Version 0.4, Oct. 2011, GlobalPlatform Inc.
EPO, Int'l Search Report in PCT/EP2013/056193, May 8, 2013.
EPO, Written Opinion in PCT/EP2013/056193, May 8, 2013.

* cited by examiner

*Primary Examiner* — Jeffrey Pwu
*Assistant Examiner* — Thong Truong
(74) *Attorney, Agent, or Firm* — Patent Portfolio Builders PLLC

(57) ABSTRACT

Security can be improved in electronic devices that use authentication images and trusted user interfaces (TUIs), and it can still be easy for users to see the TUIs by making more dynamic use of the authentication images and possibly adding color effects.

15 Claims, 3 Drawing Sheets

DISPLAY AUTHENTICATION

TECHNICAL FIELD

This invention relates to methods and devices for displaying information in trusted environments, and more particularly to authenticating information displayed in such environments.

BACKGROUND

In the world of Trusted Execution Environments (TEEs), the Trusted User Interface (TUI) has emerged as a technology of interest. The basic idea is that an electronic device, such as a smart phone for example, implements two operational environments or domains: a normal environment and a secure environment. The normal environment runs feature-rich computer operating systems (OSs) and frameworks, such as Windows Mobile, Android, Linux, etc., and the secure environment is separate from the normal environment through hardware such that the normal environment cannot access resources of the secure environment.

Hardware separation can be implemented in a number of ways, e.g., using ARM TrustZone technology, which is a system-wide approach to security on high performance computing platforms for applications, such as secure payment, digital rights management (DRM), and enterprise and web-based services. Information about ARM TrustZone is available on the internet currently at www.arm.com/products/processors/technologies/trustzone.php, among other places.

In a typical device, the rich OS has full control over the device's display screen and input device(s), such as keyboards, touchpads, etc. Nevertheless in some devices, it is useful for the secure environment to control all or part of the user interface (UI), such as a portion of the device's display screen. The idea is that the rich OS should not be able to "spoof" the user input or influence what is shown on the display (or the trusted portion of it) during such a trusted UI session (TUI). A TUI session is usually expected to be brief, for example, just long enough to enter a password or PIN code.

For an example of a useful scenario, assume that the electronic device is running a banking application running in the normal environment, and call the banking application a Client Application (CA). The CA has a corresponding Trusted Application (TA) in the secure environment that serves the CA with specific services. The TA and the user's bank share a secret key, which is encrypted and stored in the electronic device in the secure environment in trusted storage. When the banking CA wants to login to the bank, the CA calls the TA to show a TUI to the user, enabling the user to enter a password, PIN code, or other identification. The entered password is encrypted together with some additional nonce information from the bank using a key shared by the electronic device and the bank, and the encrypted information is sent to the CA, which forwards it to the bank.

The authentication protocol in the above example lacks some features critical for security, but what is important for purposes of this application is that the CA and rich OS must not be able to see or spoof the user input in the secure environment (i.e., the password, in this example).

For another example of a useful scenario, consider a standard web browser and how such a browser is used for secure transactions between a remote server and an electronic device running the browser. How can the user be sure that what is rendered in the browser window is really what the server sent and is not false information arranged to obscure the real information?

Simply put, the problem with the typical TUI is the following: how can a user be sure that the TUI really is displaying the secure environment and that the TA is really handling the user input and display? This is a difficult problem as it is relatively easy for a rogue application running in the normal environment to display a copy of a secure window that calls a user to enter a password or other private information. The user would not know the difference.

Some ideas have been developed to deal with this problem, including having the electronic device include a special indicator, such as an LED, that is hardware controlled by the secure environment and that is illuminated during a TUI session. The drawback is that the special indicator is extra material and that increases the cost of the electronic device, as well as its power consumption.

Another idea is to have the user select an "authentication picture", e.g., on a server of the device manufacturer. The selected image is sent in an encrypted form to the secure environment in the device and stored, and so the selected image is unknown to the normal environment. Whenever a TUI session is going on, the authentication image is shown in a portion of the TUI, indicating the authenticity of the TUI. A drawback is that is the authentication image does not completely cover the TUI, the normal environment might be able to overlay one or more parts of the TUI with false information, for example to change the displayed amount of a banking transaction from €1000 to €100 by covering the last zero. The user would believe the transaction is for €100 and approve it, but in reality, the transfer would be for €1000. That drawback can be mitigated if the authentication image covers the whole TUI, but then the image must be significantly dimmed so as not to disturb the information and input fields of the TUI, making it more difficult for a user to recognize that the shown authentication image really is the image the user had chosen.

These ideas are described in the literature. For example, GB 2421093 A by Band for "Trusted User Interface" describes a personalized indicator that is requested from a user, saved in secure storage in a device, and displayed or rendered when trusted system components take control of the device's display. International Publication WO 2008/048800 A1 by Hartrell et al. for "Identification and Visualization of Trusted User Interface Objects" describes a verification rendering engine that re-renders TUI objects in a manner that is based on whether the objects are verified, which is said to improve visual recognition of verified TUI objects over non-verified UI objects.

Nevertheless, known methods and apparatuses for indicating authenticity on a display screen of an electronic device still suffer from the drawbacks described above as well as other drawbacks.

SUMMARY

Those and other drawbacks are overcome by methods and apparatuses in accordance with this invention.

In accordance with aspects of this invention, there is provided a method of indicating authenticity on a display screen of an electronic device. The method includes enabling a trusted portion of the display screen; rendering, by the electronic device, an authentication image in the trusted portion of the display screen; and actuating the authentication image;

whereby authenticity is indicated by visibility of the substantially all of the authentication image in substantially all of the trusted portion.

Further in accordance with aspects of this invention, there is provided an arrangement for indicating authenticity on a display screen of an electronic device. The arrangement includes an electronic processing circuit configured for enabling trust of information in a portion of the display screen, for rendering an authentication image for the portion of the display screen, and for actuating the authentication image; whereby authenticity is indicated by visibility of substantially all of the authentication image in substantially all of the portion of the display screen.

BRIEF DESCRIPTION OF THE DRAWINGS

The several objects, features, and advantages of this invention will be understood by reading this description in conjunction with the drawings, in which.

DETAILED DESCRIPTION

This invention can be implemented in many types of electronic devices that have display screens. This description of examples of embodiments of the invention refers to the accompanying drawings, in which the same or similar reference numbers in different drawings identify the same or similar components.

The inventor has recognized that security can be improved in electronic devices that use authentication images and TUIs and that it can still be easy for users to see the TUIs by making more dynamic use of authentication images and possibly adding color effects. For example in the web browser scenario described above, the user can be given a menu selection for "sweep background", which when chosen commands a device's rendering engine to manipulate the rendered page in a random way, such as the ways described in more detail below.

Figure 1:
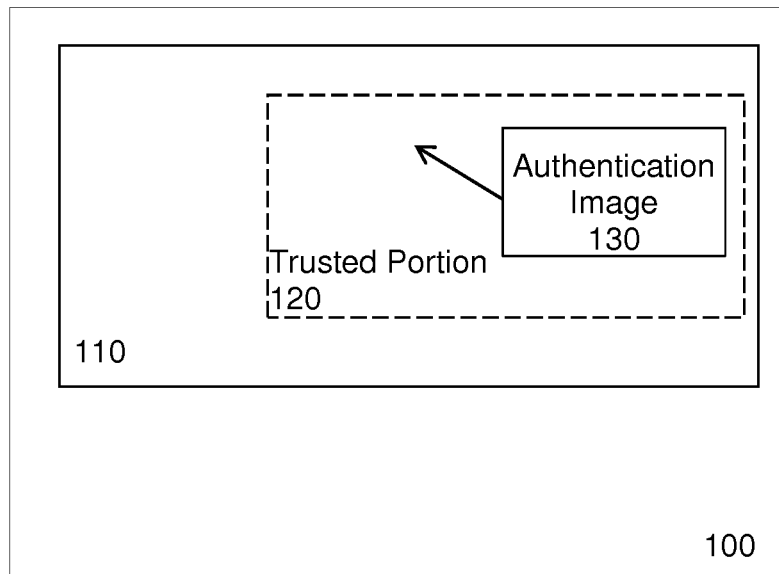
FIG. 1 illustrates a display screen of an electronic device that includes a trusted portion with an authentication image.

FIG. 1 illustrates a display screen 110 of an electronic device 100 that includes a trusted portion 120 within which an authentication image 130 is rendered by a trusted execution environment implemented in the device. The user selects the authentication image 130 in a suitable way, and the selected image is rendered in the trusted portion 120 by a suitably configured electronic processing circuit or circuits in the device 100.

As depicted in FIG. 1, the authentication image 130 is smaller than the trusted portion 120, and instead of showing a static image 130, which is to say an image that is rendered at a fixed location in the trusted portion 120, the image 130 is actuated by the processor in the device 100, which in this embodiment means the image 130 moves, as indicated by the arrow, through the trusted portion 120 as a background. For example, the authentication image 130 can move randomly or pseudo-randomly through the trusted portion, bouncing off the boundaries of the TUI, which are indicated in FIG. 1 by dashed lines, in a manner reminiscent of images in some computer screen savers. It is preferred that the motion of the image, i.e., its bouncing, should have some randomness so that, after a short time, the path of the "floating" authentication image 130 has covered a large portion of the TUI 120. Authenticity of the trusted portion is indicated by visibility of substantially all of the authentication image in substantially all of the trusted portion. In this way, an information field of the TUI is obscured or distorted by the authentication picture for only a short time, thereby remedying a serious drawback of static authentication images as described in the Background.

As an alternative to an authentication image that is actuated by the electronic device's moving the image as described above, the authentication image 130 can be actuated by a user's dragging the image through the trusted portion 120. For example, such dragging can be implemented in substantially the same way that lines are drawn in many commercially available drawing programs, which is to say that the user can click on the authentication image picture and drag it through all or substantially all of the TUI 120. The user would click on the image in a way suitable for the device 100, e.g., by finger-tapping a touch-screen 110 of the device 100.

As the authentication image 130 is dragged around the TUI 120, the device 100 or more particularly a processor in the device 100 renders a line or other suitable indication of the path of the image in the trusted portion 120. Such an indication is the arrow depicted in FIG. 1. In this way, authenticity is indicated by visibility of substantially all of the authentication image in substantially all of the trusted portion. The user can verify that the normal environment has not overlaid some part of the display nominally controlled by the secure environment, since if that has happened, then the visible path line of the dragged image will be broken by the overlay. In addition, it is advantageous for the color of the path line to chosen randomly or pseudo-randomly by the secure environment in order to prevent the normal environment from spoofing the trusted environment by adding such a line to an overlaid image generated in the normal environment.

In another embodiment also depicted by FIG. 1, the authentication image 130 is actuated by pushing or clicking on it, as the image is also an actuatable button. When a user presses or clicks on the image 130, one or more colors of the TUI are changed by the processor in the device 100 in a random or pseudo-random manner such that any overlaid area generated by the normal environment can be easily noticed by the user. In this way, authenticity is again indicated by visibility of substantially all of the authentication image in the proper color(s) in the trusted portion 120.

Figure 2A:
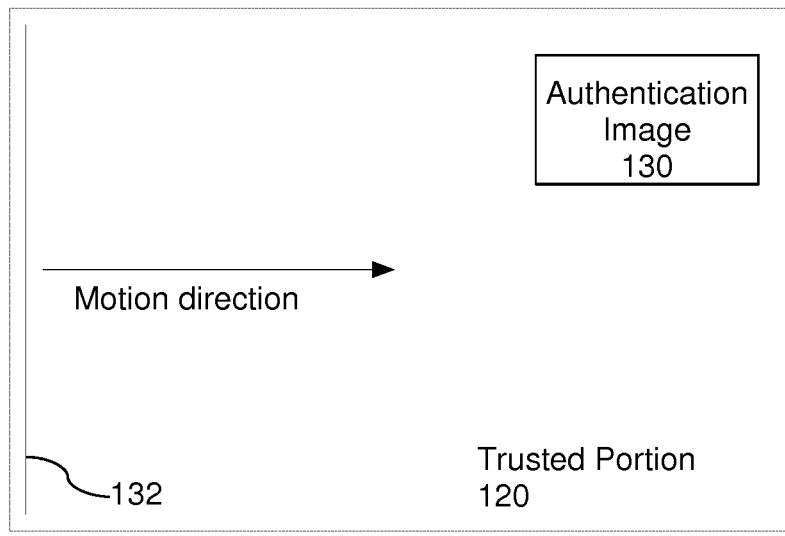
FIG. 2A illustrates a visible indicator added to a trusted portion of a display screen.
Figure 2B:
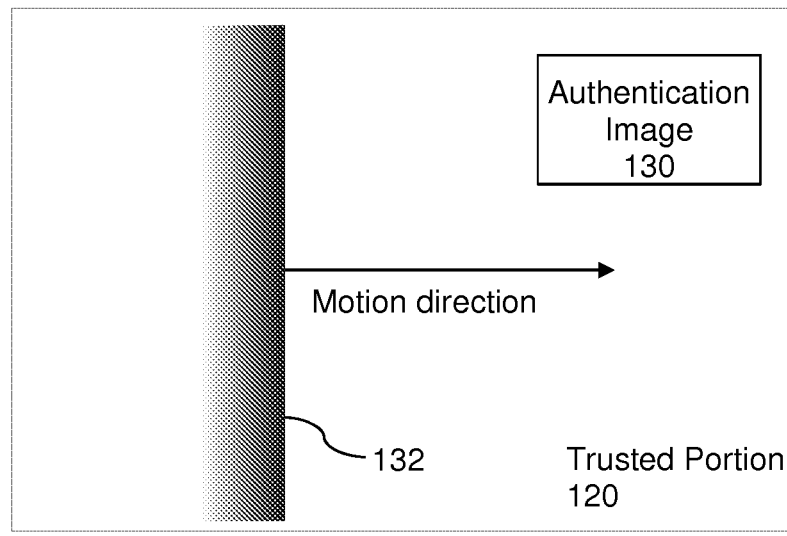
FIG. 2B illustrates motion of the visible indicator added to a trusted portion of a display screen.

FIGS. 2A, 2B illustrate an alternative embodiment in which the authentication image 130 is actuated by adding a visible indicator 132 in the trusted portion 120 of the display screen 110, and moving the indicator 132 through the authentication image 130 and trusted portion 120. As shown in FIG. 2A, the user would see a vertical bar 132 that moves horizontally, in a direction perpendicular to the long direction of the bar, starting for example from the left-hand side of the TUI 120. The indicator shown in FIG. 2A is a vertical bar that is initially drawn from the top left corner to the bottom left corner of the TUI 120 and then sweeps across the screen until it reaches the right side of the window/screen, but it will be understood that other indicators and arrangements can be used. At the end of its motion across the TUI 120, the indicator 132 can be configured so that either it bounces from the TUI boundary and moves in the opposite direction until it bounces from another TUI boundary or it re-starts its sweep from where it began. By continuously moving through the TUI 120, the indicator 132 can cover all or substantially all of the TUI without visually disturbing a user too much. The indicator 132 preferably has a small but clearly visible thickness and a color that is randomly or pseudo-randomly chosen when rendered by the secure environment.

It will be understood that the authentication image 130, which can be an image chosen by the user, is preferably present in the trusted portion 120 of the screen 110 at all times that the trusted portion is visible. The authentication image can be smaller than the trusted portion so that it can be rendered unobtrusively, e.g., in a corner of the trusted portion. The authenticity of the trusted portion is indicated by moving the indicator 132 at least from time to time through most or all of the trusted portion, in the course of which the indicator 132 sweeps over the authentication image 130, too. It will be appreciated, of course, that the authentication image can also move randomly or pseudo-randomly through the trusted portion as the indicator 132 moves through the trusted portion.

FIG. 2B depicts an embodiment in which the indicator 132 is configured such that its color affects or alters the background color of the TUI 120 for a range of pixels (e.g., 10-15 pixels) behind the indicator as it sweeps by. The altered color of those "dragging" pixels, which constitute an area of the TUI 120 adjacent the indicator 132, can gradually fade to the normal background color of the TUI with distance from the indicator 132, and can be colored differently from the main indicator 132, for an improved user experience.

Figure 3:
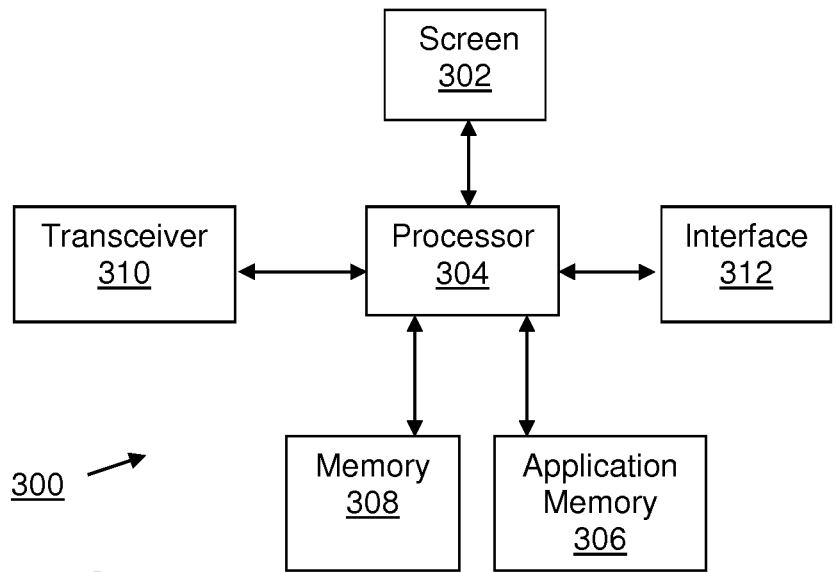
FIG. 3 is a block diagram of an electronic device having a display screen that can be configured for a trusted portion.

FIG. 3 is a block diagram of an electronic device 300 that illustrates an arrangement for indicating authenticity on a display screen 302 of the device. The arrangement includes an electronic processing circuit 304 configured for enabling a trusted portion of the display screen 302, for rendering an authentication image in the trusted portion of the display screen, and for actuating the authentication image as described above. Authenticity is indicated by visibility of substantially all of the authentication image.

The electronic processing circuit 304 is advantageously a digital processor and implements a normal environment and a secure environment by executing one or more computer programs stored in an application memory 306. Information used by the programs and processor, such as the authentication image 130, can be stored in portions of a suitable memory 308.

The electronic device can include other devices, such as a transceiver 310 for sending and receiving signals from and to the device 300, and an interface 312 for accepting signals based on user actions. The transceiver 310 can include a cellular radio or other wireless or wired transceiver, and the interface 312 can include a keyboard, mouse, or other input device.

The electronic processing circuit 304 is advantageously suitably programmed to implement methods of indicating authenticity on the display screen 302 of the electronic device 300. Such methods are described above and are illustrated by FIG. 4, which is a flow chart of a method indicating authenticity on a display screen of an electronic device.

In block 402, a trusted portion of the display screen is suitably enabled, and in block 404, an authentication image is rendered in the trusted portion of the display screen. Block 406 depicts actuating the authentication image in the manners described above, where authenticity is indicated by visibility of the authentication image in substantially all of the trusted portion.

It should be understood that this and other methods and apparatus described in this application do not require encryption of the portion of the display screen, only trust. The authentication image can be encrypted when the user chooses it on some web server, and it must be encrypted before it is transmitted to the Trusted Execution Environment such that the rich OS in the normal environment of the device cannot see it. Thus, the user selects an authentication image, the selected image is encrypted, the encrypted image is transferred to the electronic device, which decrypts the encrypted image and stores it for rendering in a trusted portion of the device's display screen.

Figure 4:
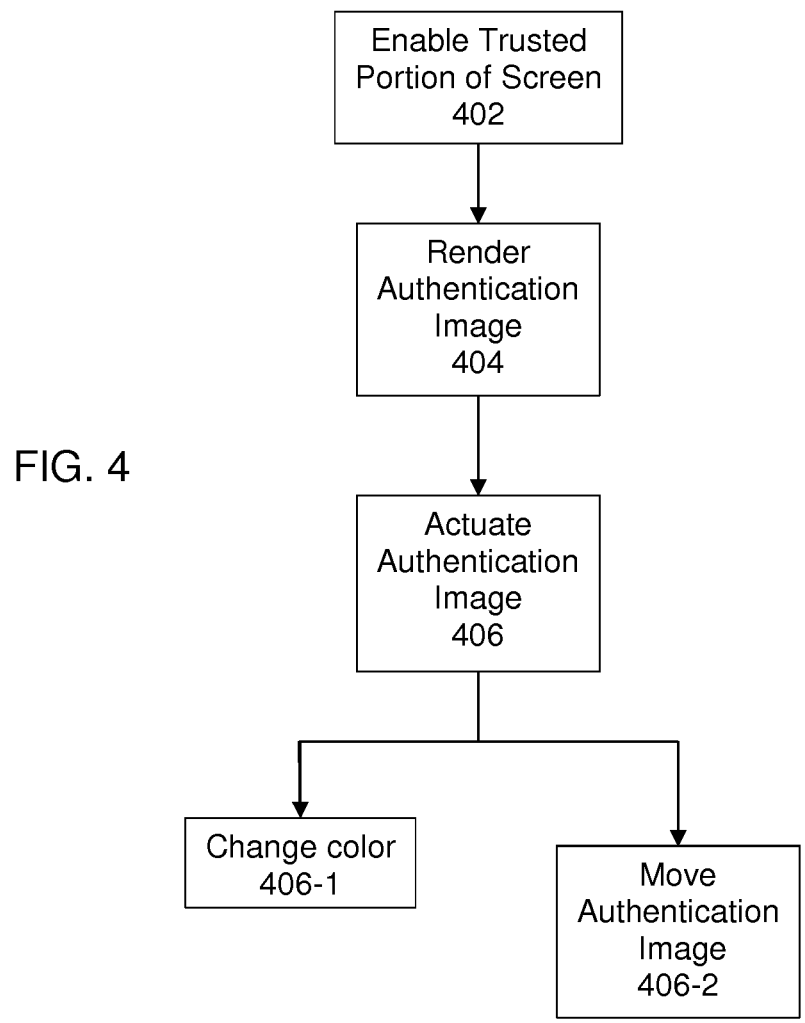
FIG. 4 is a flow chart of an example of a method of indicating authenticity on a display screen of an electronic device.

As illustrated by block 406-1 in FIG. 4, actuating the authentication image can include randomly or pseudo-randomly changing a color of the authentication image. Further as illustrated by block 406-2 in FIG. 4, actuating the authentication image can include moving the authentication image through substantially all of the trusted portion of the display screen, either by the device itself without user initiation or other action or by the device's responding to user action. For example, moving the authentication image can include dragging the authentication image through at least part of the trusted portion of the display screen, and even forming a visible track indicating a path of the authentication image dragged through the trusted portion of the display screen. The visible track can have a color that is randomly or pseudo-randomly selected.

Also as illustrated by block 406-2, actuating the authentication image can include generating a visible indicator in the trusted portion of the display screen, such as the indicator 132 that can be treated as part of the authentication image, and sweeping the visible indicator between sides of the portion of the display screen. It will be understood that the portion of the authentication image chosen by the user is present in the trusted portion of the screen at all times that the trusted portion is visible, and can be smaller than the trusted portion so that it can be rendered unobtrusively, e.g., in a corner of the trusted portion. The authenticity of the trusted portion is indicated by moving the indicator at least from time to time through most or all of the trusted portion, in the course of which the indicator sweeps over the user-selected image, too.

As described above in connection with FIG. 2B, the indicator can have a color, and sweeping the indicator can include temporarily changing a color of the trusted portion of the display screen in an area adjacent the indicator to a color based on the color of the indicator.

This invention solves problems arising from needing an authentication image to statically cover a TUI. Such complete coverage has the drawbacks that the TUI can become hard to read without significantly dimming the authentication image, which makes recognizing the authenticity of the image harder to recognize.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions can be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of indicating authenticity on a display screen of an electronic device, comprising:
   (a) enabling a trusted portion of the display screen;
   (b) rendering, by the electronic device, an authentication image in the trusted portion of the display screen;
   (c) actuating the authentication image;
   whereby authenticity is indicated by visibility of the authentication image in the trusted portion; and
   wherein the authentication image is smaller than the trusted portion of the display screen, and actuating the authentication image includes moving at least one of a bar, a line, another indication, and the authentication image through and within boundaries of the trusted portion of the display screen such that an information field of the trusted portion is obscured or distorted for a period of time thereby providing visibility of the authentication image in the trusted portion of the display screen whereby verification can be made that the trusted portion of the display screen has not been overlaid.

2. The method of claim 1, wherein actuating the authentication image comprises randomly or pseudo-randomly changing a color of the authentication image.

3. The method of claim 1, wherein moving the authentication image includes dragging the authentication image through at least part of the trusted portion of the display screen.

4. The method of claim 3, wherein moving the authentication image further includes forming a visible track indicating a path of the authentication image dragged through the trusted portion of the display screen.

5. The method of claim 4, wherein the visible track has a color that is randomly or pseudo-randomly selected.

6. The method of claim 1, wherein the bar has a color, and moving the bar such that the information field of the trusted portion is obscured or distorted for a period of time includes temporarily changing a color of the trusted portion of the display screen in an area adjacent the bar to a color based on the color of the bar.

7. The method of claim 6, wherein the color of the trusted portion of the display screen in an area adjacent to the bar is randomly or pseudo-randomly selected.

8. An arrangement for indicating authenticity on a display screen of an electronic device, comprising:
   an electronic processing circuit configured for enabling trust of information in a portion of the display screen, for rendering an authentication image for the portion of the display screen, and for actuating the authentication image;
   whereby authenticity is indicated by visibility of the authentication image in the portion of the display screen; and
   wherein the authentication image is smaller than the trusted portion of the display screen, and actuating the authentication image includes moving at least one of a bar, a line, another indication, and the authentication image through and within boundaries of the trusted portion of the display screen such that an information field of the trusted portion is obscured or distorted for a period of time thereby providing visibility of the authentication image in the trusted portion of the display screen whereby verification can be made that the trusted portion of the display screen has not been overlaid.

9. The arrangement of claim 8, wherein the electronic processing circuit actuates the authentication image by at least randomly or pseudo-randomly changing a color of the authentication image.

10. The arrangement of claim 8, wherein the authentication image is smaller than the portion of the display screen, and the electronic processing circuit actuates the authentication image by at least moving at least one of a bar, a line, another indication, and the authentication image through and within boundaries of the portion of the display screen such that an information field of the portion is obscured or distorted for a period of time thereby providing visibility of the authentication image in the portion of the display screen whereby verification can be made that the portion of the display screen has not been overlaid.

11. The arrangement of claim 10, wherein the bar has a color, and moving the bar such that the information field of the portion is obscured or distorted for a period of time includes temporarily changing a color of the portion of the display screen in an area adjacent the bar to a color based on the color of the bar.

12. The arrangement of claim 11, wherein the color of the portion of the display screen in an area adjacent to the bar is randomly or pseudo-randomly selected.

13. The arrangement of claim 10, wherein moving the authentication image includes dragging the authentication image through at least part of the portion of the display screen.

14. The arrangement of claim 13, wherein moving the authentication image further includes forming a visible track indicating a path of the authentication image dragged through the portion of the display screen.

15. The arrangement of claim 14, wherein the visible track has a color that is randomly or pseudo-randomly selected.

* * * * *